(12) United States Patent
Cancel et al.

(10) Patent No.: US 9,045,233 B2
(45) Date of Patent: Jun. 2, 2015

(54) LOCKING DEVICES FOR VALVES AND OTHER EQUIPMENT

(75) Inventors: Joseph Marvin Cancel, Howell, NJ (US); Anthony George Baker, Eatontown, NJ (US); John Zarzyski, Brick, NJ (US)

(73) Assignee: Air Cruisers Company, Wall Township, NJ (US)

( * ) Notice: Subject to any disclaimer, the term of this patent is extended or adjusted under 35 U.S.C. 154(b) by 567 days.

(21) Appl. No.: 13/438,017

(22) Filed: Apr. 3, 2012

(65) Prior Publication Data

US 2013/0256571 A1    Oct. 3, 2013

(51) Int. Cl.
*F16K 35/06* (2006.01)
*B64D 25/14* (2006.01)

(52) U.S. Cl.
CPC ............... *B64D 25/14* (2013.01); *Y10T 403/75* (2015.01); *F16K 35/06* (2013.01)

(58) Field of Classification Search
USPC ................ 137/383, 385, 377–382, 229, 233; 251/89, 90, 91, 92; 441/41, 90, 93, 96, 441/101; 70/166–169, 175–180; 222/83
See application file for complete search history.

(56) References Cited

U.S. PATENT DOCUMENTS

| | | | | |
|---|---|---|---|---|
| 211,400 | A | * | 1/1879 | Harlin et al. .................... 70/180 |
| 1,762,195 | A | * | 6/1930 | Roberts .......................... 137/382 |
| 3,062,417 | A | * | 11/1962 | Frederick et al. ........ 222/402.11 |
| 4,355,987 | A | * | 10/1982 | Miller ............................. 441/41 |
| 4,375,877 | A | | 3/1983 | Shorey |

* cited by examiner

*Primary Examiner* — John K Fristoe, Jr.
*Assistant Examiner* — Jonathan Waddy
(74) *Attorney, Agent, or Firm* — Kilpatrick Townsend & Stockton LLP; Dean W. Russell

(57) ABSTRACT

Pin-locking devices are detailed. The devices may be placed atop inflation valves and mechanically interfere with movement of pins associated with the valves. Some versions of the devices are single-piece, rigid discs including through holes and curved protrusions interacting with inflation pins.

11 Claims, 5 Drawing Sheets

LOCKING DEVICES FOR VALVES AND OTHER EQUIPMENT

FIELD OF THE INVENTION

This invention relates to devices designed to prevent actuation of valves and other equipment and more particularly, although not necessarily exclusively, to devices that mechanically interfere with movement of inflation pins associated with vessel escape slides and rafts.

BACKGROUND OF THE INVENTION

U.S. Pat. No. 4,375,877 to Shorey, whose contents are incorporated herein in their entirety by this reference, describes one of many possible emergency evacuation systems for vessels such as aircraft. Certain then-existing systems disclosed in the Shorey patent include sources of compressed air for inflating evacuation slides and "relatively complex actuation arrangements for activating the gas supply at a proper time within the system deployment sequence." See Shorey, col. 2, ll. 21-23. Systems of the Shorey patent likewise utilize cylinders of compressed gas for inflation, with valves supplying the compressed gas being "actuated by trigger lanyards that extend upwardly from the valves." See id., col. 5, ll. 67-68. The trigger lanyards connect to spring-loaded pins, and pulling of the pins actuate the valves. See id., col. 8, ll. 62-68. To reduce risk of premature inflation of the slides, shear pins are used. See id., col. 6, ll. 7-12.

Absent from description in the Shorey patent is any means for securing inflation pins in locked positions. Consequently, gas cylinders remain subject to premature deployment during packing, for example. Cylinders also may be inadvertently de-armed.

SUMMARY OF THE INVENTION

The present invention resolves these issues by providing tools or devices for securing inflation pins in locked positions. Developed principally (but not necessarily exclusively) for C-130 evacuation systems, embodiments of the invention may be constructed of one or more parts to be placed atop inflation valves. A single-part version nevertheless may include multiple features mechanically interfering with movement of the pins.

At least some versions, for example, comprise circular discs made of machined steel or other relatively rigid material. Each disc may include a protrusion, beneficially shaped generally like a banana, that fits in the travel path of an inflation pin and thereby blocks its movement. A disc also may include a hole designed to hold the inflation pin in place. In versions of the invention designed for use with either left- or right-hand valves, two holes may be included (i.e. one for each type of valve). Yet additionally, the central portion of each disc may have a slightly-sloped edge which, when applied, emits a snapping sound (caused by frictional contact of the disc against a bearing on a valve) to alert an installer that the disc is securely positioned.

It thus is an optional, non-exclusive object of the present invention to provide devices for securing positions of inflation pins.

It is another optional, non-exclusive object of the present invention to provide devices for mechanically interfering with movement of pins of inflation valves.

It is also an optional, non-exclusive object of the present invention to provide devices, in the form of disks, having features that prevent movement of the pins.

It is a further optional, non-exclusive object of the present invention to provide devices having grooves, holes, and sloping edges, all assisting in reducing risk of premature release of inflation gas from a container.

Other objects, features, and advantages of the present invention will be apparent to those skilled in the art with reference to the remaining text and the drawings of this application.

DETAILED DESCRIPTION

Figure 1:
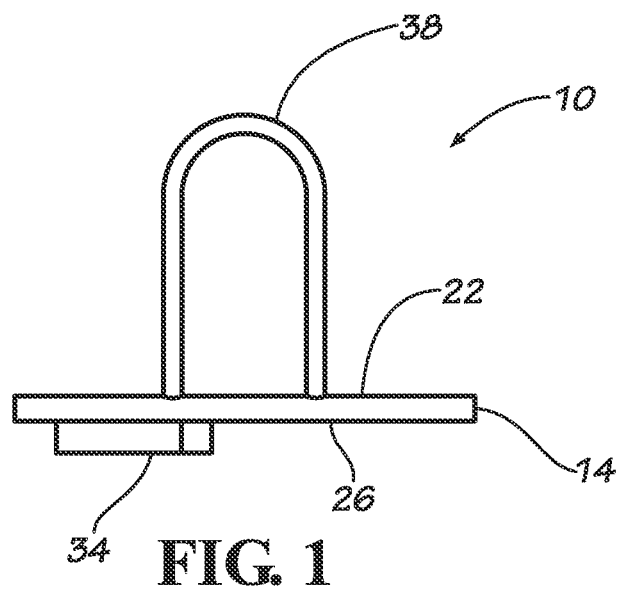
FIG. 1 is an elevational view of an exemplary device of the present invention.

FIGS. 1-6 illustrate device 10 exemplary of the present invention. As depicted, device 10 is formed predominantly as an annular disc 12. Accordingly, device 10 may define outer circumference 14 and inner circumference 18. Although device 10 beneficially is generally annular so as to interact effectively with container 20 (see, e.g., FIG. 4), it may be shaped otherwise if useful for interacting with other types of containers.

At least some versions of device 10 may be made of stainless steel, with a diameter of approximately 1.25" and a major part approximately 0.070" thick. As with its shape, however, the material, diameter (or width), and thickness of device 10 may differ as appropriate to achieve any desired objective of its use. Nor need any of these characteristics necessarily be uniform throughout device 10.

Device 10 may include (nominally) upper and lower surfaces 22 and 26, respectively, each beneficially being substantially planar. Extending through device 10 may be at least one hole, with two such holes 30A and 30B clearly shown in FIGS. 2-4. Device 10 additionally may include protrusion 34 extending (nominally) downward from lower surface 26. Collectively, a hole (30A or 30B) and protrusion 34 act to inhibit premature deployment of gas from container 20. Although presently-preferred versions of device 10 include both protrusion 34 and at least one hole, other versions may omit one or the other of these features.

Also optionally included as part of device 10 is bracket 38. Bracket 38, if present, may extend (nominally) upward from upper surface 22. The bracket 38 may receive ring R in order to connect it to warning strip W as illustrated in FIGS. 3-6. As shown especially in FIG. 3, bracket 38 may be soldered or welded onto upper surface 22, although other attachment techniques may be employed instead.

Figure 2:
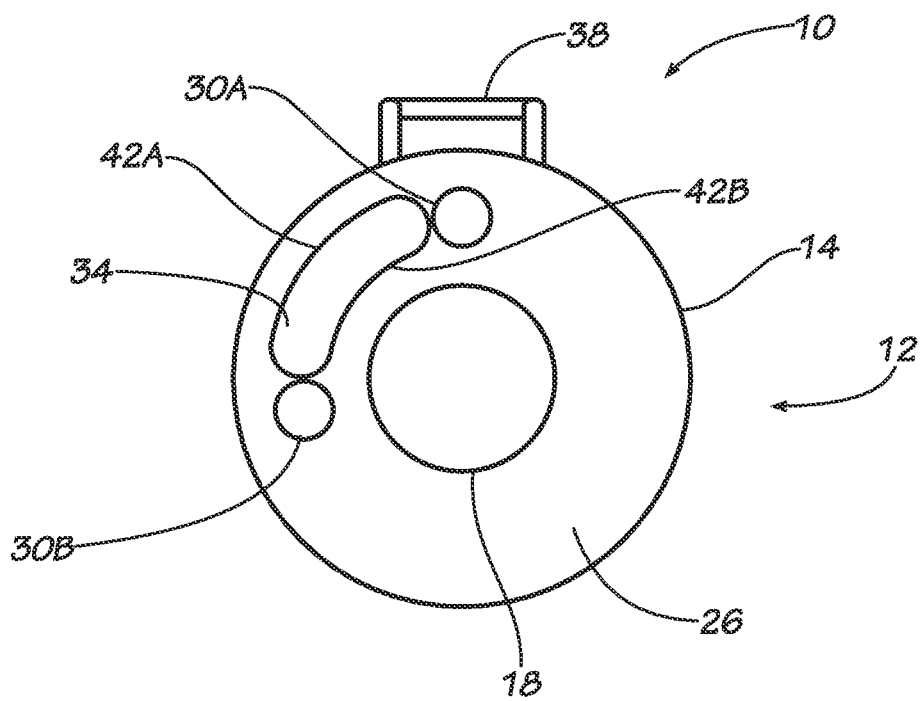
FIG. 2 is a plan view of a lower side of the device of FIG. 1.
Figure 3:
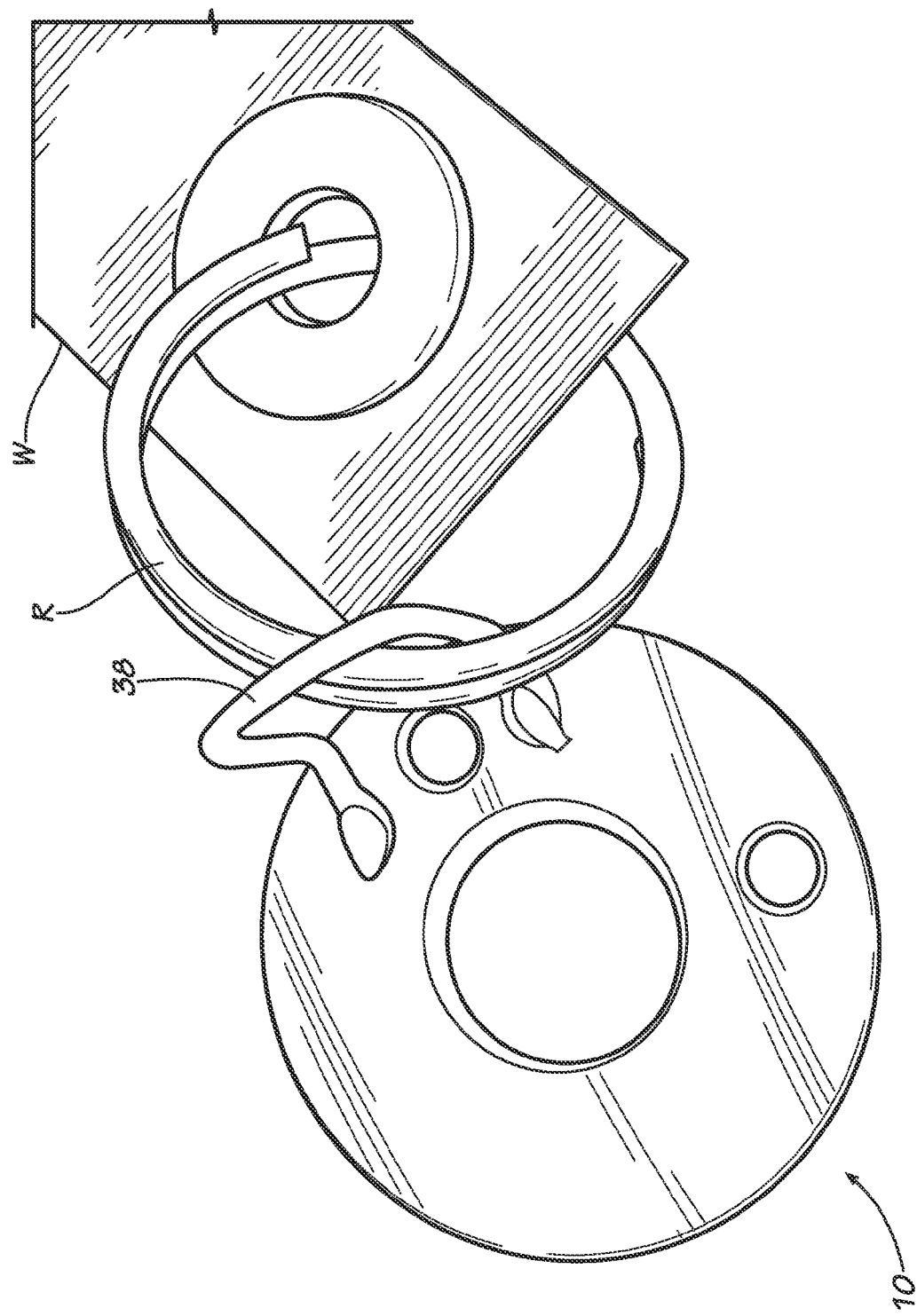
FIG. 3 is a plan view of an upper side of the device of FIG. 1 shown connected to a warning strip.
Figure 4:
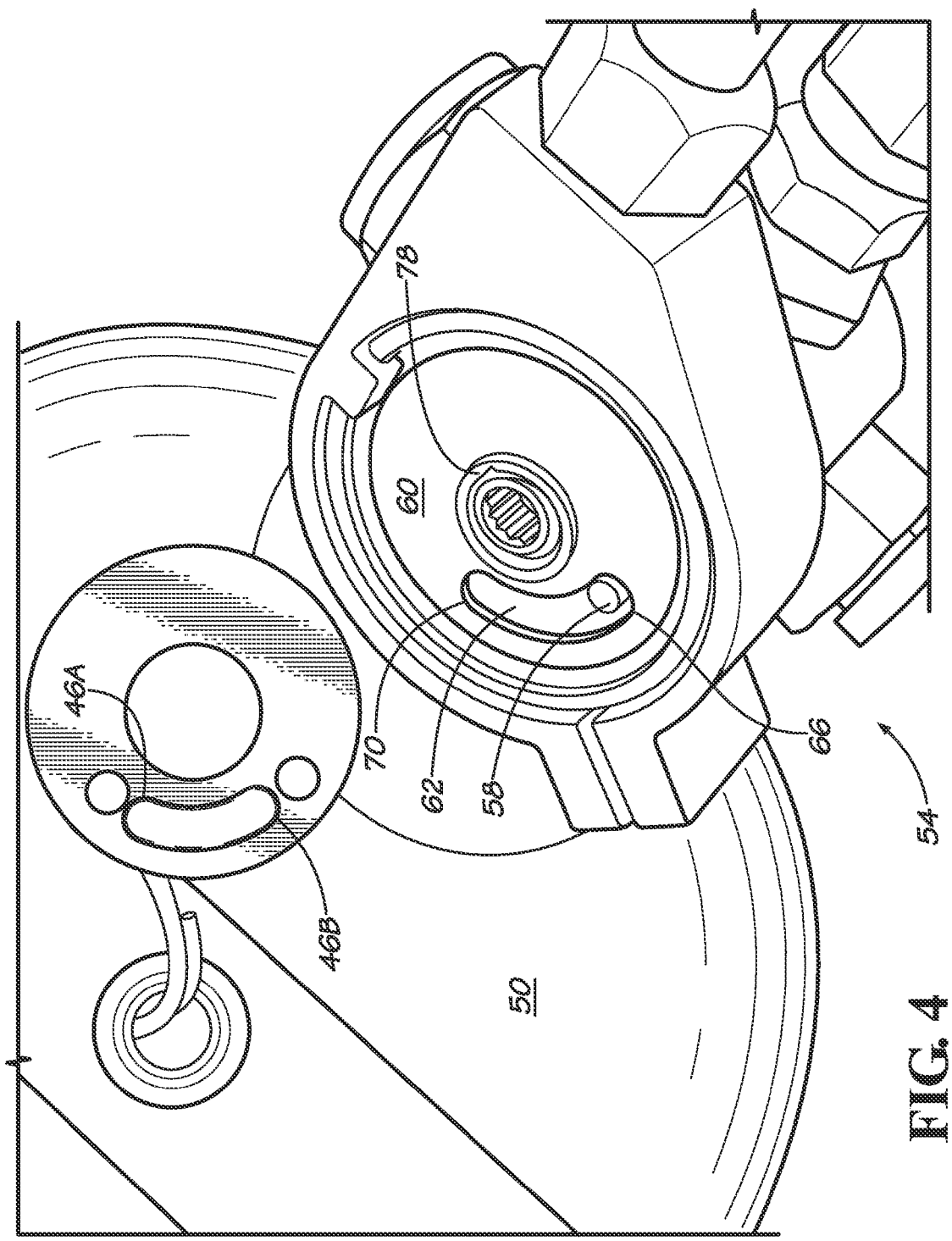
FIG. 4 is a perspective view of portions of a sample gas-supply container together with the device of FIG. 1.

FIGS. 2 and 4 illustrate a presently-preferred shape of protrusion 34. As illustrated, protrusion 34 resembles the shape of a banana. Indeed, at least some versions of protrusion 34 may have curved, spaced, parallel major sides 42A-B together with curved ends 46A-B, although other shapes may be utilized instead as necessary or desired. Protrusion 34 beneficially is machined together with disc 12 of device 10, although it may be welded or soldered onto (or otherwise attached to) lower surface 26.

Figure 5:
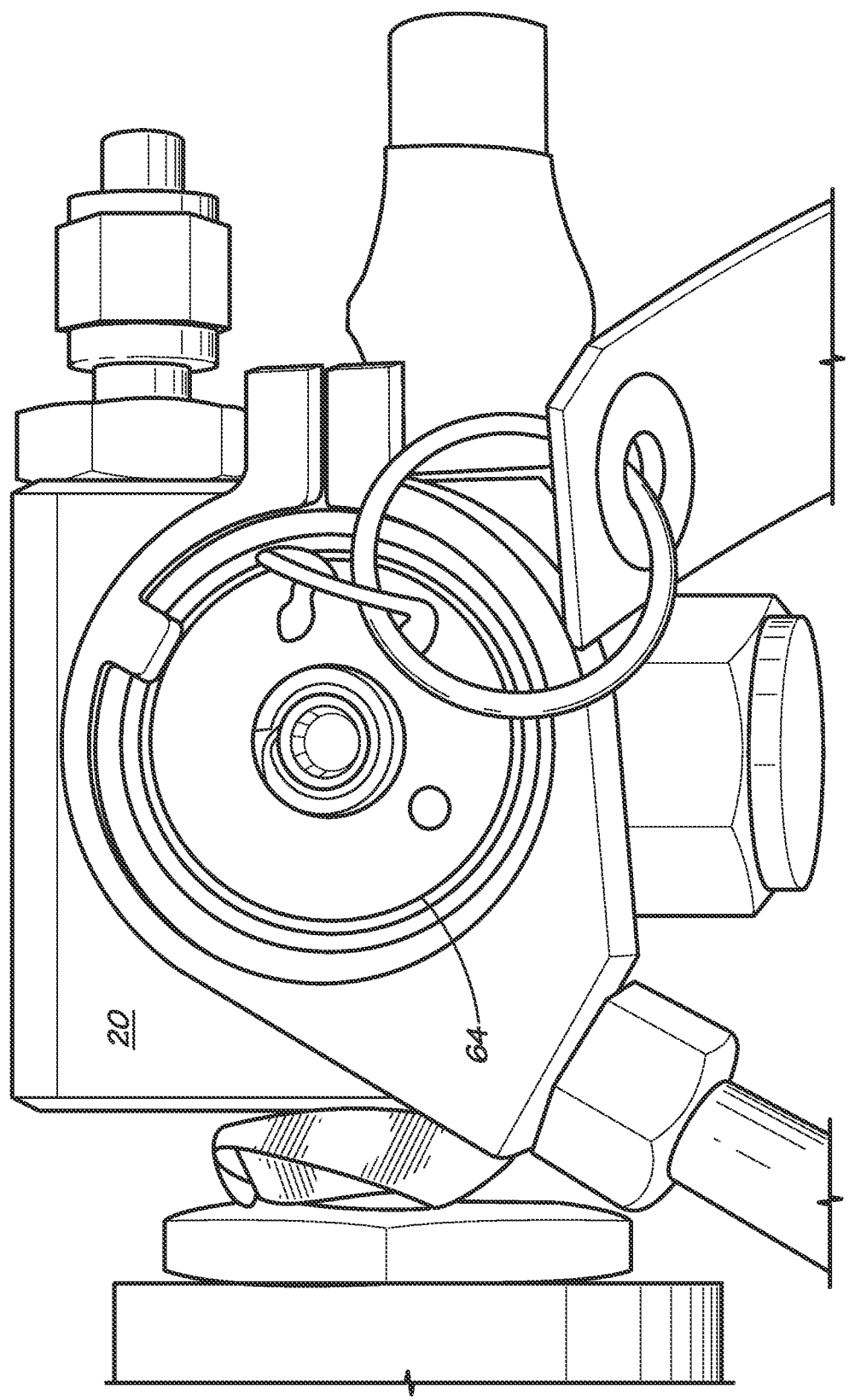
FIG. 5 is a plan view of the container of FIG. 4 and the device of FIG. 1.
Figure 6:
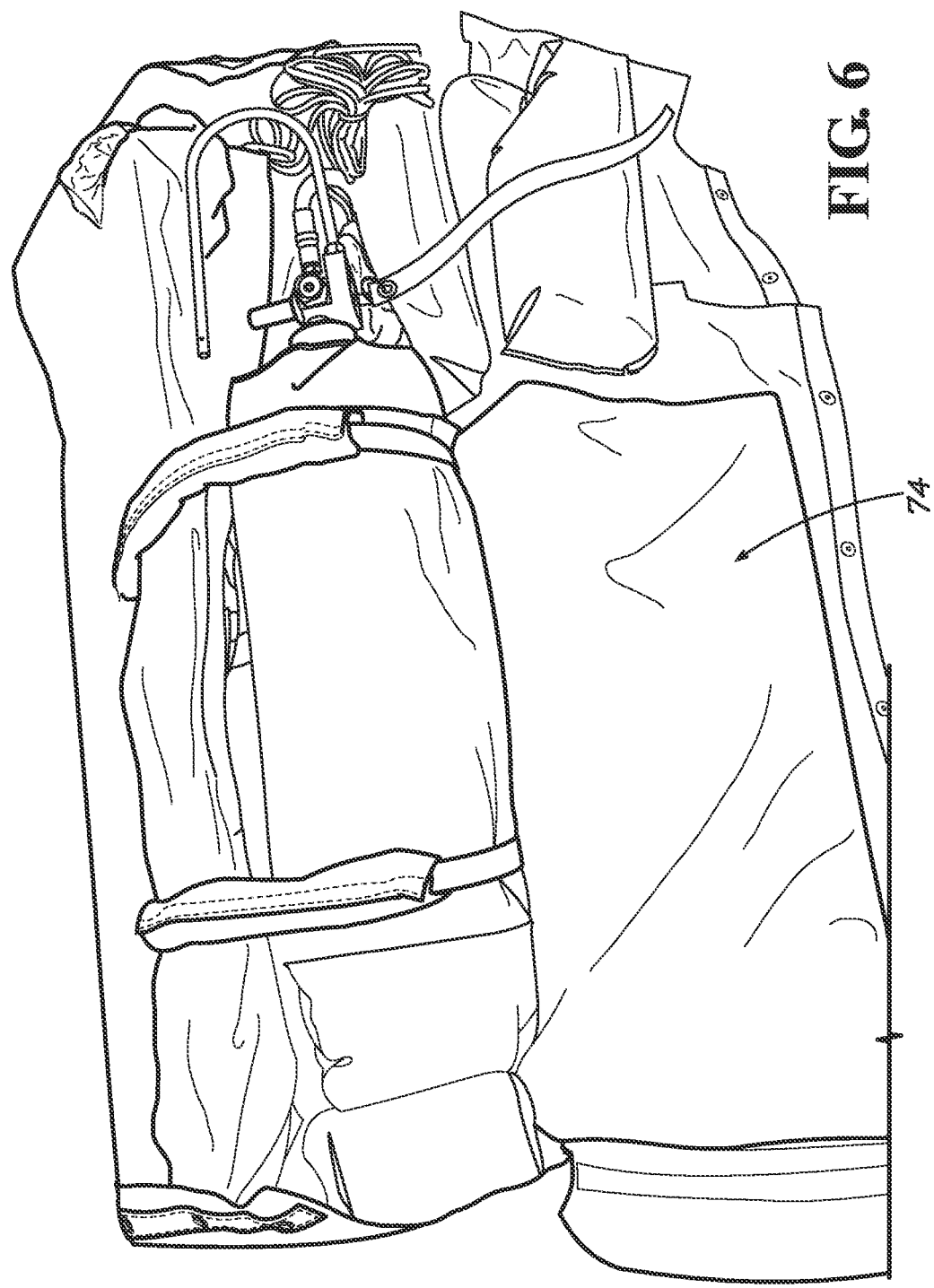
FIG. 6 is a perspective view of the container of FIG. 4 and the device of FIG. 1 together with portions of one or more objects intended to be inflated by the gas within the container.

Container 20 typically comprises a conventional cylinder 50 or similar structure containing compressed gas. Valve assembly 54 including pin 58 and disc 60 may be part of container 20, with disc 60 including a banana-shaped groove 62. Illustrated in FIGS. 4-5 is that both pin 58 and disc 60 are present in circular recess 64 of assembly 54. Arming of the valve assembly 54 involves moving pin 58 from a first end 66 to a second end 70 of groove 62 (or, for some containers, moving pin 58 from second end 70 to first end 66). Upon arming, container C is available to deploy gas to inflate objects 74 such as (but not limited to) escape slides or rafts.

FIGS. 4-5 detail interaction of device 10 with valve assembly 54. In particular, device 10 may be fitted snugly into recess 64, with pin 58 protruding through one of holes 30A or 30B and protrusion 34 fitted into groove 62. Together, protrusion 34 and pin 58 (essentially) fill the space available within groove 62, preventing any material movement of the pin 58 in the groove and hence locking it in position. Accordingly, when device 10 is in place, pin 58 is restricted to its starting position (at either first end 66 or second 70) and thus cannot move in a manner inadvertently arming valve assembly 54.

If desired, inner circumference 18 may include a slightly sloped edge, allowing a snap fitting as it frictionally contacts central edge 78 of valve assembly 54. When arming of valve assembly 54 is desirable, device 10 need merely be removed to allow movement of pin 58. Such removal itself may occur easily, merely by pulling warning strip W sufficiently to overcome the frictional engagement of device 10 with recess 64.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A device for preventing movement of a pin within a generally banana-shaped, curved groove, comprising:
   a. a disc having (i) a first surface and (ii) a first hole sized to accommodate the pin; and
   b. a generally banana-shaped, curved protrusion extending from the first surface so as to be received by the curved groove when the first hole accommodates the pin.

2. A device for preventing movement of a pin within a curved groove, comprising:
   a. a disc having (i) a first surface, (ii) a second surface opposed to the first surface, and (iii) a first hole sized to accommodate the pin;
   b. a curved protrusion extending from the first surface so as to be received by the curved groove when the first hole accommodates the pin; and
   c. a bracket extending from the second surface.

3. A device according to claim 2 in which the disc is annular and the curved protrusion has a length less than a length of the curved groove.

4. A device according to claim 3 in which the disc has a second hole sized to accommodate the pin.

5. A device according to claim 4 in which, for any particular use thereof, only one of the first or second holes accommodates the pin.

6. A device according to claim 5 in which the disc has an inner circumference that is slightly sloped.

7. A system for inhibiting premature inflation of an inflatable object, comprising:
   a. a container of compressed gas;
   b. a valve assembly connected to the container so as to selectively allow gas to flow from the container to the object, the valve assembly including a pin and a generally banana-shaped, curved groove in which the pin travels; and
   c. means for preventing movement of the pin in the curved groove, comprising:
      i. a disc having (A) a first surface; and (B) a first hole sized to accommodate the pin; and
      ii. a generally banana-shaped, curved protrusion extending from the first surface so as to be received by the curved groove when the first hole accommodates the pin.

8. A system according to claim 7 in which the object is an escape slide or raft.

9. A method of inhibiting premature inflation of an inflatable object, comprising inserting a device into a recess of a valve assembly connected to a container of compressed gas, the device comprising (a) a disc having (i) a first surface and (ii) a first hole sized to accommodate a pin of the valve assembly and (b) a protrusion extending from the first surface so as to be received by a groove of the valve assembly when the first hole accommodates the pin.

10. A method according to claim 9 in which the protrusion and groove are curved.

11. A method according to claim 9 further comprising removing the device from the recess when inflation of the inflatable object is no longer premature.

* * * * *